United States Patent [19]

Rekers et al.

[11] Patent Number: 4,743,657

[45] Date of Patent: May 10, 1988

[54] METHOD FOR PREPARING POLYMER BOUND STABILIZERS MADE FROM NON-HOMOPOLYMERIZABLE STABILIZERS

[75] Inventors: John W. Rekers, Spartanburg, S.C.; Gerald Scott, Lichfield, England

[73] Assignee: Milliken Research Corporation, Spartanburg, S.C.

[21] Appl. No.: 839,926

[22] Filed: Mar. 17, 1986

[51] Int. Cl.$^4$ ............................................ C08F 271/02
[52] U.S. Cl. ................................. 525/281; 522/116; 522/118; 522/123; 522/125; 525/242; 525/260; 525/263; 525/274; 525/279; 525/282; 525/291; 525/293; 525/296; 525/300; 525/301; 525/302; 525/304; 525/426; 525/445

[58] Field of Search ............... 525/279, 282, 375, 274, 525/281, 291, 293, 296, 300, 301, 304, 426, 445, 260, 263, 302; 524/99, 102; 522/116, 118, 123, 125

[56] References Cited

U.S. PATENT DOCUMENTS

| | | | |
|---|---|---|---|
| 3,640,928 | 2/1972 | Murayama et al. | 260/293.86 |
| 3,705,166 | 12/1972 | Murayama et al. | 260/23 XA |
| 4,354,007 | 10/1982 | Scott | 525/370 |
| 4,356,307 | 10/1982 | Kelkenberg et al. | 546/200 |
| 4,520,171 | 5/1985 | Diveley | 525/279 |

*Primary Examiner*—Theodore E. Pertilla
*Attorney, Agent, or Firm*—Terry T. Moyer; H. William Petry

[57] ABSTRACT

A method is provided for preparing a polymer bound stabilizer which comprises reacting a stabilizer precursor molecule containing a reactive double bound which is not readily homopolymerizable with a pre-formed polymer in the presence of a free radical.

14 Claims, No Drawings

METHOD FOR PREPARING POLYMER BOUND STABILIZERS MADE FROM NON-HOMOPOLYMERIZABLE STABILIZERS

The present invention relates to a method for preparing polymer bound stabilizers. More particularly, the present invention relates to a method for preparing polymer bound stabilizers made from stabilizer molecules which are not readily homopolymerizable.

It has long been known that synthetic polymers, especially thermoplastic polymers, are sensitive to a wide variety of degradative processes which may be initiated by exposure to, for instance, ultraviolet radiation and thermal oxidation. This deficiency must be overcome in order for these polymers to find their widest practical application, and a substantial body of art has developed over the years directed to compositions and processes for stabilizing these polymers. The most commonly employed method for stabilizing polymers has been to incorporate an appropriate additive compound (of which there is a wide variety) into the polymer composition, singly or in various combinations, for the purpose of protecting the polymer structure. Traditionally, most of these stabilizing compounds have been non-polymeric, relatively low molecular weight compounds so that volatility and marginal compatibility of these compounds with the base polymer may cause loss of the additives by way of migration, leaching and similar processes, with a concomitant deterioration in stability.

More recently, an approach has been suggested to overcome certain of the known problems of leaching, volatility and marginal compatibility of traditional stabilizers wherein the stabilizer molecule is chemically bonded to a polymer. Thus, as disclosed, for instance, in U.S. Pat. No. 4,354,007 to Scott (herein the '007 patent) a wide variety of antioxidant and stabilizer molecules may be reacted with pre-formed polymers in the presence of free radicals to provide a stabilized polymer which may be used directly to make a final product or which may be used as a "masterbatch" which may be mixed with further amounts of a suitable, compatible base polymer to provide a stabilized polymer product suitable for a wide variety of end use applications.

The '007 patent describes a wide variety of antioxidant and stabilizer molecules including compounds selected from categories which include chain-breaking or peroxide-decomposing antioxidants, ultraviolet screening agents, triplet quenchers and metal deactivators. In terms of a limitation on the scope of the stabilizer compounds that may be used, perhaps the most significant structural limitation is that it should be one that "gives rise to a free radical in the molecule" (see col. 1, lines 49-50). In this regard, however, it has been found with regard to the unsaturated or vinyl group containing stabilizer compounds described in the '007 patent and also as to similar stabilizer compounds which have been suggested by others for grafting to pre-formed polymers in the presence of free radicals, that frequently the reactivity of the stabilizer molecules containing polymerizable groups may be such that the stabilizer may tend to homopolymerize with itself to form a polymer or oligomer. Such an oligomer may, of course, have increased molecular weight as compared to the individual stabilizer molecule and this increased weight may inhibit undesired volatilization, and/or migration of the stabilizer in the polymer composition. The oligomeric species may even become bound or grafted to the polymer in which form it will again, of course, offer certain advantages, especially resistance to migration and volatilization.

Unfortunately, however, homopolymerization or oligomerization of the stabilizer molecule may generally result in decreased activity of the stabilizer molecule in the polymer system. Thus these materials, especially when the stabilizer activity is measured in a newly formed polymer composition, may show overall lower stabilization activity as compared to a polymer system containing comparable levels of non-polymerized individually grafted stabilizer molecules. While these homopolymerizable or oligomer forming stabilizer species may out-perform the conventionally stabilized polymers over the long term or after the polymers have been subjected to severe conditions, it would be highly desirable to provide a polymer system which has been stabilized with molecules that tend not to preferentially polymerize with themselves or graft copolymerize but which also are sufficiently reactive that they will readily graft with a preformed polymer in the presence of a free radical. By so doing the typically high levels of initial stabilization activity which may characterize certain of the traditional "non-bound" stabilizers may be achieved while also avoiding or minimizing many of the problems associated with such traditional stabilizers such as migration, leaching and similar processes.

Accordingly, the present invention provides a method for preparing a polymer bound stabilizer which comprises reacting a stabilizer precursor molecule containing a reactive double bond which is not readily homopolymerizable with a pre-formed polymer in the presence of a free radical.

According to a preferred embodiment, the stabilizer precursor molecules which may be used according to the process include those selected from

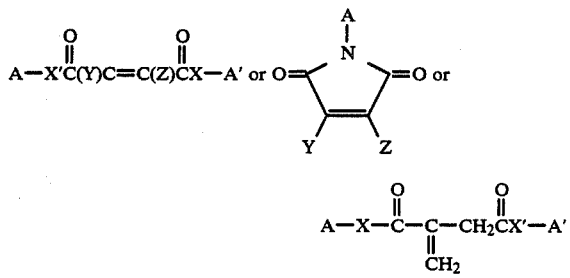

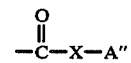

in which:
X and X' are independently selected from oxygen or nitrogen;
Y and Z are independently selected from H, $C_1-C_{18}$ alkyl groups, or $$-\overset{O}{\underset{\|}{C}}-X-A''$$

in which X is defined above, and
A is selected from a chain breaking antioxidant functionality, a peroxide decomposer functionality, an ultraviolet light screening functionality, a metal deactivator functionality or a triplet quencher functionality; and A' and A" are independently selected from A, Y or Z.

The structure of the stabilizer precursor molecules, according to the invention may be described as containing essentially two components, a linking or bonding component (that is the portion of the molecule which provides the reactive double bond) and an active stabilizer functionality-providing component. As long as an individual stabilizer precursor molecule contains both components a wide variety of specific structures may be envisioned. As may be understood by reference to the following structural formulas, preferential linking or bonding components may be represented by the following:

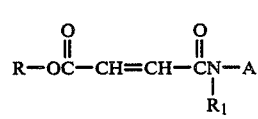

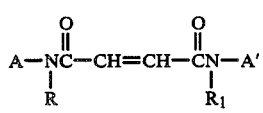

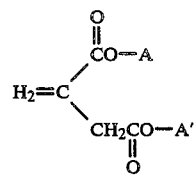

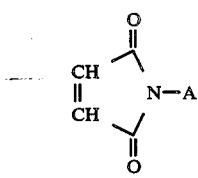

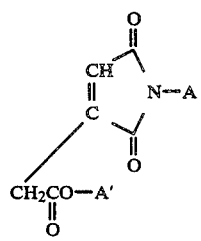

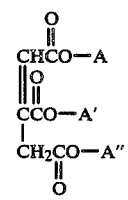

in which R and $R_1$ are independently selected from hydrogen, or an alkyl group containing from 1 to about 18 carbon atoms.

In the above formulas which represent the preferred linking or bonding component of the stabilizer precursor molecule, the descriptions A and optionally A' and A" represent the stabilizer functionality components. The various categories of stabilizer functionalities may be represented by the following formulas:

(1) Chain breaking antioxidants and their precursors, including hindered phenols, hindered piperidines, and aryl amine antioxidants:

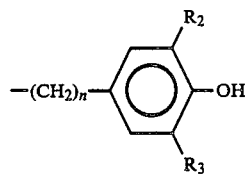

in which n is an integer from 1 to about 6, and $R_2$ and $R_3$ are independently selected from methyl, t-butyl, or phenyl; or

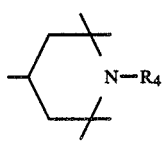

in which $R_4$ is hydrogen, oxygen, or an alkyl or aryl group containing from 1 to about 8 carbon atoms; or

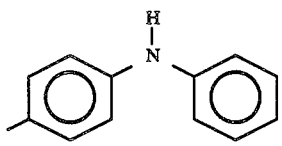

(2) Peroxide decomposing antioxidants:

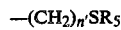

$-(CH_2)_{n'}SR_5$ in which n' is an integer from 1 to about 18 and $R_5$ is hydrogen or an alkyl group containing from 1 to about 18 carbon atoms, (3) Ultraviolet light screening agents, including benzophenone and benzothiazole UV absorbers:

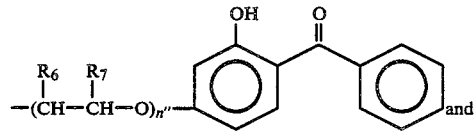

and

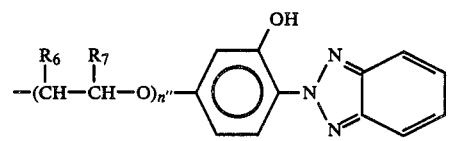

in which $R_6$ and $R_7$ are independently selected from hydrogen, methyl, or ethyl and n" is an integer from 0 to about 10.

(4) Triplet quenchers, peroxide decomposers, including nickel and zinc chelates:

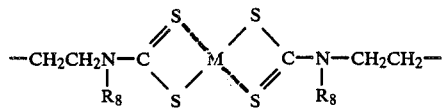

in which $R_8$ is hydrogen or an alkyl or aryl group containing from 1 to about 10 carbon atoms, and M is Ni or Zn.

(5) Metal deactivators, including hydrazides:

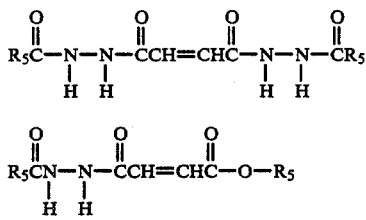

in which $R_5$ is defined above.

Preferred hindered piperidine stabilizers of the present invention include:

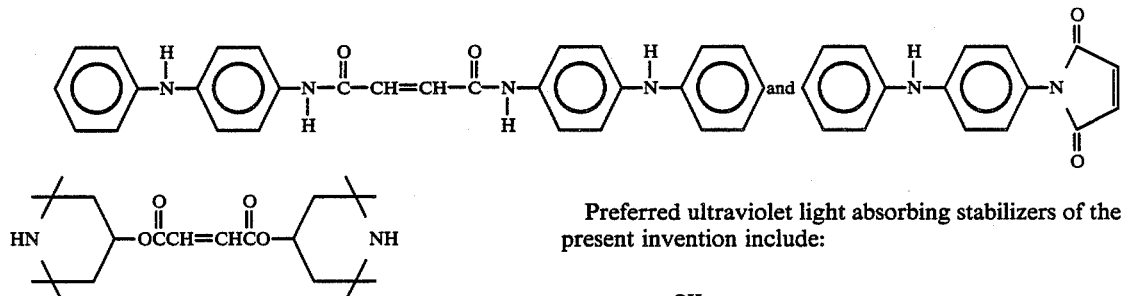

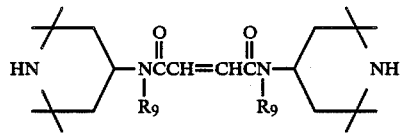

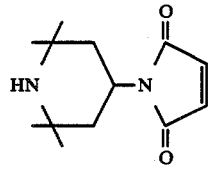

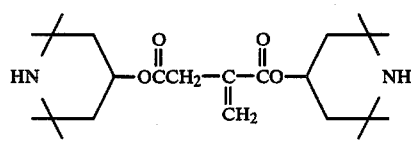

where $R_9$ is hydrogen or a lower alkyl group containing up to 8 carbon atoms.

The hindered phenols of the present inventions include 2,6-dialkyl or diaryl substituted phenols in which at least one alkyl or aralkyl group is tertiary. Preferred hindered phenols of the present inventions include:

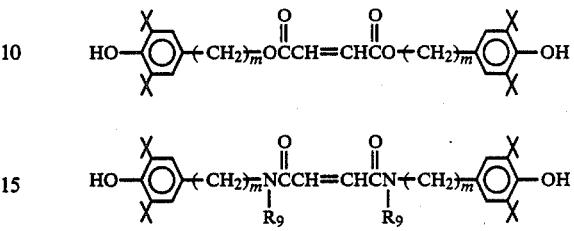

where m is 1 to 6 and $R_9$ is defined above.

Preferred arylamine antioxidants of the present invention include

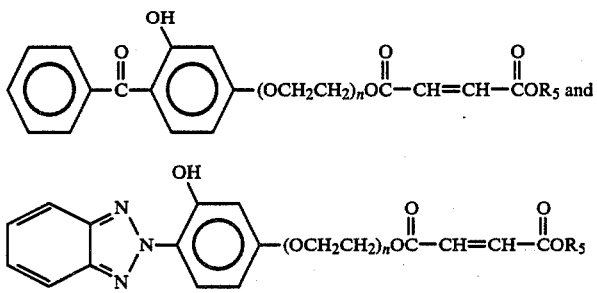

Preferred ultraviolet light absorbing stabilizers of the present invention include:

where n=1 to 6 and $R_5$ is defined above.

Preferred peroxide decomposing antioxidants of the present invention include:

$$R_5S(CH_2)_{n'}OCCH=CHCO(CH_2)_{n'}SR_5 \text{ and}$$

where n'=1 to 18 and $R_5$ is defined above.

Preferred metal deactivating stabilizers of the present invention include:

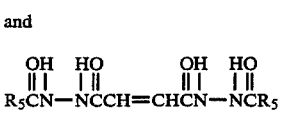

and where $R_5$ is defined above.

Any of a wide variety of polymers may be used in the process of the present invention. Those polymers which contain carbon, hydrogen, oxygen and/or nitrogen may be preferred. Examples include thermoplastic polymers such as polyolefins homopolymers and copolymers, rubber modified polyolefins, polystyrene, rubber modified polystyrene, polyvinylchloride, polyamides, polyesters, acrylonitrile-butadiene-styrene. Of course mixtures or blends of polymers may be used. The polymers will normally have a high molecular weight so that they are suitable for film or fiber forming purposes, although low molecular weight polymers and even liquid polymers may be used especially when the adducts are to be used as additives for other polymers. It has been found that it is not necessary for the polymer to contain unsaturated groups, although polymer substrates having up to about 15 percent unsaturation may be used. In the case of a masterbatch, it is particularly convenient to use essentially saturated polymers to form a masterbatch concentrate of polymer bound antioxidants or stabilizers and in this case, it is normally preferred to restrict the unsaturation in the masterbatch polymer substrate to less than 15% in order not to sensitize the polymer to oxidation when the masterbatch is subsequently added to it.

Any of a wide range of antioxidant or stabilizer compounds may be used according to the process. It may function in terms of its stabilizing effect on the polymer system in a wide variety of ways. Thus, for example, the stabilizer may be a chain breaking or peroxide decomposing antioxidant, an ultraviolet screening agent, a triplet quencher or a metal deactivator. One skilled in the art will recognize that these terms have a definite meaning. For further details, reference may be made to "Atmospheric Oxidation and Antioxidants" by G. Scott, Elsevier, 1965, in particular Chapters 4 and 5 as well as "Polymer Stabilization," Ed. W. Lincoln Hawkins, Wiley-Interscience, 1972. The stabilizer compounds of the present invention are to be distinguished from agents such as hydrogen, chlorine or even simple thiols which merely react with a polymer to remove sites of potential oxidative attack, e.g., ethylenic doublebonds. Antioxidants in the sense in which this term is understood in the art and in which it is used herein act by interfering with the free radical autooxidation process by which a polymer is oxidatively degraded, for example, by removing the chain propagating radicals involved or by direct reaction with radical generators, notably hydroperoxides, which initiate the autooxidation process.

As with the conventional antioxidants and stabilizers, more than one of the above-mentioned compounds may be used to produce a synergistic effect.

The process is particularly suitable for reacting antioxidants with polymers during melt processing or mastication. Under these conditions, the addition of a radical generator is often beneficial. Examples of suitable radical generators include peroxides, such as dicumyl peroxide and 2,5-dimethyl-2,5-di(-t-butylperoxy)hexane, azo compounds, such as azo bis isobutyronitrile (AIBN), or redox systems, such as a hydroperoxide and a polyamine or persulfate and a reducing agent.

Alternatively, generation of free radicals can be effected mechanochemically by mastication of the polymer, as in an extruder or internal mixer, or with actinic radiation such as ultraviolet light or γ-radiation. Ultraviolet light initiated reactions are preferably catalyzed with photoactivators which may lead to hydrogen abstraction via an energetic species. In the case where a photosensitizer is used, the optimum ratio of antioxidant to photosensitizer depends upon the polymer, the antioxidant and the photosensitizer, but is normally in the range of 20:1 to 0.5:1. The range 10:1 to 1:1 is preferred.

The preferred methods for generating free radicals in the polymer are by the addition of an initiator or by mastication at a temperature appropriate for the polymer system.

Where a generator is required, it will be appreciated that such generator should suitably be such that it is dissociated substantially completely at the end of the reaction since otherwise residual generator may react with the subsequent polymer undesirably. For example, residual generator may crosslink the polymer when it is not desired. In other words, the generator is added to promote formation of the bound stabilizer and when this function is fulfilled, it should not affect the polymer further.

It may also be possible to carry out the grafting reaction in two stages. The first stage may involve building hydroperoxides into the polymer, for example by prior oxidation, followed by using the hydroperoxide as a built in grafting initiator in the presence of UV light or a reducing agent.

In general it may be advantageous to exclude oxygen from the reactions described above; however, in the case of some ethylenically unsaturated compounds it has been found that the presence of oxygen in small amounts, for example oxygen present as impurity in commercial grade nitrogen, leads to a more even distribution of the stabilizer in the polymer.

The optimum activity of the bound stabilizer depends on the ratio of stabilizer to initiator. This varies with the stabilizer, the polymer and the type of initiator system used. The weight ratio, however, is normally from 100:1 to 0.25:1, especially 10:1 to 0.25:1; the range 20:1 to 0.5:1, especially 15:1 to 0.75:1 is preferred in the case of peroxide initiators.

When the stabilizer is used to modify the properties of the polymer, it will generally be added in an amount of from about 0.01 to 10 percent, typically 0.05 to 3 percent, more usually 0.10 to 2 percent by weight based upon the weight of the polymer. When, on the other hand, the stabilizer is added to form an adduct which can be used to modify the properties of another polymer, larger quantities can be used. Typically up to 15 to 30 percent by weight may be preferred.

The temperature at which the reaction by means of which the stabilizer becomes bonded to the polymer is carried out will naturally depend upon the radical concentration in the medium. In general, temperatures from 0° to 325° C. will be suitable. Below the preferred temperature range uneconomically long reaction times or uneconomical amounts of initiator may be required. Above the desired temperature range, undesirable secondary reactions may occur. In chemical-mechanical processes where no initiator is present, the temperature used will depend largely upon the nature of the polymer; for low density polyethylene a temperature in the order of 150° C. is generally suitable.

This procedure provides a very convenient way of producing a polymer bound stabilizer by direct grafting during manufacture or in subsequent processing. It may be especially desirable to prepare masterbatches, that is polymers containing a high stabilizer concentration. Polymers produced in this way may be used as additives for unmodified polymers of the same chemical substrate composition or polymers having an essentially different substrate structure. The resulting solid polymers produced may also be used as additives to confer oxidative stability on other polymers.

As with conventional stabilizers, more than one of the above-mentioned compounds may be reacted together with the polymer to give bound synergistic stabilizer systems.

The following examples serve to further illustrate the subject matter of the present invention. Unless otherwise indicated, the parts and percentages are by weight.

EXAMPLE 1

Preparation of mono-(3,3,5,5-tetramethyl-4-piperidinyl)maleate (MPME): Equimolar quantities of maleic anhydride and 2,2,6,6-tetramethyl-4-hydroxypiperidine were heated in benzene (approximately a 20% solution) under reflux for 1 hour. On cooling, part of the half ester precipitated. The solvent was evaporated to give the half ester in 95% yield. The solid had IR, $^1$H NMR, and $^{13}$C NMR consistent with the structure.

EXAMPLE 2

Preparation of bis(3,3,5,5-tetramethyl-4-piperidinyl)maleate (BPME): A mixture of 10.4 g of dimethyl maleate, 25.0 g of 4-hydroxyl-2,2,6,6-tetramethylpiperidine, and 15 drops of titanium (IV) isopropoxide in 100 ml of xylene were heated to a gentle boil with slow distillation of evolved methanol. After 20 hours, the reaction was cooled and 0.1 ml of water and 5 g of celite were added. The mixture was filtered, solvent removed under reduced pressure, and 100 ml of hexanes were added. After cooling briefly to −20° C., the solid was collected by filtration and washed with water. After drying, 25.2 g of product was obtained (m.p. 80°–82° C.; spectral data consistent with structure).

EXAMPLE 3

Preparation of bis(3,3,5,5-tetramethyl-4-piperidinyl)fumarate (BPFE): Using the procedure of Example 2, reaction of 12.5 g of 4-hydroxy-2,2,6,6 tetramethylpiperidine, 5.2 g of dimethyl fumarate, and 0.2 ml of the titanate in 150 ml xylene gave 13.5 g of the white bis fumarate, m.p. 156°–159° C. (spectral data consistent with structure).

EXAMPLE 4

Preparation of bis(3,3,5,5-tetramethyl-4-piperidinyl)itaconate (BPIE): Using the procedure of Example 2, reaction of 6.0 g of dimethyl itaconate, 12.5 g of 4-hydroxy-2,2,6,6-tetramethylpiperidine, and 0.1 ml of the titanate in 90 ml of xylenes gave 8.3 g of the white bis itaconate, m.p. 77°–81° C. (spectral data consistent with structure).

EXAMPLE 5

Preparation of N,N'-bis(3,3,5,5-tetramethyl-4-piperidinyl)maleamide (BPMA): Reaction of 7.9 g of 4-amino-2,2,6,6-tetramethylpiperidine and 3.1 g of dimethyl maleate in 80 of boiling xylenes for 5 days gave (after work-up as in Example 2) 3.5 g of the bis amide, m.p. 142°–147° C. (spectral data consistent with structure).

EXAMPLE 6

Preparation of N-(3,3,5,5-tetramethyl-4-piperidinyl)maleimide (PMI): Equal molar quantities of maleic anhydride and triacetonediamine were combined in ether giving a white precipitate which was dried to give the intermediate maleamic acid. The maleamic acid, 16.0, 1.4 g of sodium acetate and 60 ml of acetic anhydride was heated at 90° C. for 2 hours. The mixture was cooled and the precipitate which formed was filtered. The precipitate was dissolved in water and extracted with chloroform. Evaporation of the chloroform gave a tan solid. Infrared and NMR spectroscopic analysis were consistent with the expected structure (C=O, 1705 cm$^{-1}$).

EXAMPLES 7-33

Preparation of polymer bound stabilizers—general procedure: Polymer, reactive additive, and initiator were melt processed in a Brabender torque rheometer at 70 rpm. The type of polymer, additive concentration, peroxide initiator concentration, reaction time, and melt temperature are shown in Table 1. The resulting compositions were analyzed quantitatively for extent of binding by GC analysis of methylene chloride extracts and qualitatively by IR of extracted films. The results are shown in the table.

TABLE 1

| EXAMPLE # | POLYMER | % ADDITIVE[1] | % PEROXIDE[2] | REACTION CONDITIONS TIME (MINS.) | TEMP. (°C.) | % REACTED |
|---|---|---|---|---|---|---|
| 7 | PP | 10% MPME | 0.15% Di-Cup R | 10 | 180 | NA[3] |
| 8 | PP | 10% BPIE | 1.8% Varox DBPH | 20 | 180 | NA[3] |
| 9 | PP | 10% BPFE | 1.8% Varox DBPH | 20 | 180 | 90% |
| 10 | PP | 10% BPMA | 1.8% Varox DBPH | 20 | 180 | NA[3] |
| 11 | PP | 8.9% PMI | 0.3% Vul-Cup R | 20 | 180 | NA[3] |
| 12 | PP | 10% BPME | 1.0% Vul-Cup R | 5 | 200 | 75 |
| 13 | PP | 10% BPME | 1.0% Di-Cup R | 10 | 180 | 60 |
| 14 | PP | 10% BPME | 1.1% Varox DBPH | 20 | 180 | 70 |
| 15 | PP | 10% BPME | 1.0% Vul-Cup R | 20 | 180 | 71 |
| 16 | PP | 10% BPME | 2.5% Vul-Cup R | 20 | 180 | 87 |
| 17 | PP | 1.0% BPME | 0.2% Lupersol 130 | 30 | 180 | 77 |
| 18 | PP | 3.0% BPME | 0.2% Lupersol 130 | 30 | 180 | 69 |
| 19 | PP | 5.0% BPME | 0.2% Lupersol 130 | 30 | 180 | 64 |
| 20 | PP | 2.5% BPME | 0.43% Varox DBPH | 20 | 180 | 83 |
| 21 | PP | 5.0% BPME | 0.87% Varox DBPH | 20 | 180 | 85 |
| 22 | PP | 7.5% BPME | 1.3% Varox DBPH | 20 | 180 | 86 |
| 23 | PP | 10% BPME | 1.7% Varox DBPH | 20 | 180 | 88 |
| 24 | PP | 15% BPME | 2.6% Varox DBPH | 20 | 180 | 91 |
| 25 | PP | 10% BPME | 0.87% Varox DBPH | 20 | 180 | 79 |
| 26 | PP | 10% BPME | 2.6% Varox DBPH | 20 | 180 | 94 |
| 27 | PP | 10% BPME | 4.3% Varox DBPH | 20 | 180 | 95 |

TABLE 1-continued

| EXAMPLE # | POLYMER | % ADDITIVE[1] | % PEROXIDE[2] | REACTION CONDITIONS | | % REACTED |
|---|---|---|---|---|---|---|
| | | | | TIME (MINS.) | TEMP. (°C.) | |
| 28 | PP | 10% BPME | 6.1% Varox DBPH | 20 | 180 | 95 |
| 29 | LDPE | 5.0% BPME | 1.0% Di-Cup R | 20 | 180 | 95 |
| 30 | LDPE | 10.0% BPME | 1.7% Varox DBPH | 20 | 180 | 95 |
| 31 | EPDM | 5.0% BPME | 1.0% Di-Cup R | 20 | 180 | 92 |
| 32 | APP | 5.0% BPME | 0.87% Varox DBPH | 20 | 180 | 81 |
| 33 | APP | 10.0% BPME | 1.7% Varox DBPH | 20 | 180 | 94 |

[1]BASED ON WEIGHT OF POLYMER; ABBREVIATIONS FROM EXAMPLES 1-6
[2]BASED ON WEIGHT OF POLYMER; DI-CUP R = DICUMYL PEROXIDE; VUL-CUP R = BIS(TERT-BUTYLPEROXYISOPROPYL)BENZENE; LUPERSOL 130 = 2,5-DIMETHYL-2,5-DI(T-BUTYLPEROXY)-3-HEXYNE; VAROX DBPH = 2,5-DIMETHYL-2,5-DI(T-BUTYLPEROXY) HEXANE
[3]ANALYZED QUALITATIVELY BY IR ANALYSIS OF $CH_2CL_2$ EXTRACTED FILM

EXAMPLE 34

A composition was prepared by melt processing 4.0 g of BPME and 36.0 g of polypropylene under conditions similar to Examples 7-33 (20 minutes at 180° C.) but with no added peroxide. Analysis of the resulting polymer by IR of a methylene chloride extracted film and by GC of the extract indicated that, within the limits of the analysis, little or none of the BPME had reacted with or become bound to the polymer.

EXAMPLE 35

Some of the polymer bound stabilizers from Examples 7-33 were evaluated for relative UV stabilization activity in polypropylene. The masterbatches were diluted to 0.2% active stabilizer concentration in polypropylene powder containing 0.1% calcium stearate and 0.1% Goodrite 3114 hindered phenolic antioxidant. After melt compounding (5 minutes at 200° C.), compression molded films were prepared (ca. 7-10 mils thick). The samples were exposed in a Xenon Weatherometer and tested periodically for embrittlement using a manual bend test. The results are shown in Table 2.

TABLE 2

| Additive[1,2] | Hours To Failure In Xenon Weatherometer |
|---|---|
| 2% of product from Example 8 | 850 |
| 2% of product from Example 10 | 1000 |
| 2% of product from Example 15 | 1600 |
| 20% of product from Example 17 | 850 |
| 6.7% of product from Example 18 | 900 |
| 4% of product from Example 19 | 1050 |
| 8% of product from Example 20 | 700 |
| 4% of product from Example 21 | 750 |
| 2.7% of product from Example 22 | 1000 |
| 2% of product from Example 23 | 800 |
| 2% of product from Example 26 | 900 |
| 2% of product from Example 27 | 700 |
| 2% of product from Example 28 | 700 |
| 2% of product of Example 30 | 800 |
| 4% of product of Example 32 | 700 |
| 2% of product of Example 33 | 800 |
| Control[1] | 250 |

[1]Base Resin: Profax 6501 Polypropylene 0.1% Calcium Stearate 0.1% Goodrite 3114
[2]0.2% Active UV Stabilizer Concentration

EXAMPLE 36

Two of the polymer bound stabilizers from Examples 7-32 were evaluated for UV and thermal stabilization activity in thin film relative to the commercially available, unbound stabilizers Chimassorb 944 and Tinuvin 770 (Ciba-Geigy Corp.). The base formulation was the same as in Example 35. Samples were prepared by melt compounding followed by extrusion of film (1-2 mils thick). Testing results are shown in Table 3.

TABLE 3

| Additives[1,2] | Hours To Failure In Xenon Weatherometer | | Hours to Failure at 150° C. in air |
|---|---|---|---|
| | Not Extracted | Extracted[3] | Not extracted |
| 1% of product from Example 14 | 1735 | 755 | 110 |
| 1% of product from Example 33 | 1850 | 1250 | 240 |
| 0.1% Chimassorb 944 | 1250 | 635 | 110 |
| 0.1% Tinuvin 770 | 765 | 100 | 60 |
| Control[1] | 250 | 100 | 50 |

[1]Base Resin: Profax 6501 PP 0.1% Calcium Stearate 0.1% Goodrite 3114
[2]0.1% Active UV Stabilizer Concentration
[3]Extracted 24 Hours With Acetone Before Testing

EXAMPLE 37

SYNTHESIS OF 4-ANILINOPHENYL MALEAMIC ACID

Equimolar quantities of maleic anhydride and 4-aminodiphenylamine were dissolved in chloroform. The resultant orange precipitate was collected after 30 minutes, filtered and dried in vacuo and was characterized as having a melting point of 183° C.

EXAMPLE 38

SYNTHESIS OF 4-ANILINOPHENYLMALEIMIDE (AMI)

Fifty grams of AMA were dissolved in 200 cm³ acetic anhydride containing 4 grams of sodium acetate. The resulting solution was heated to 70° C. for a period of 10 minutes. On cooling, a scarlet precipitate formed which was filtered and washed with cold methanol. The product was dried in vacuo and showed a melting point of 163° C.

EXAMPLE 39

REACTION OF AMI WITH POLYPROPYLENE

AMI, 0.080 g, and 0.080 g of dicumylperoxide in 39.92 g of polypropylene were processed in a closed torque rheometer at 180° C. for 10 minutes. The polymer was compression molded into film (10 mil). The film was extracted with hot methylene chloride and the thermal oxidative stability of the film at 150° C. was compared both before and after extraction with similar films containing a commercial heat stabilizer. The results are shown in Table 4 for several concentrations of additive.

TABLE 4
COMPARISON OF AMI BOUND IN POLYPROPYLENE BEFORE AND AFTER EXTRACTION WITH A COMMERCIAL HEAT STABILIZED FORMULATION (HOURS TO EMBRITTLEMENT)

| Formulation | Before Extraction | After Extraction |
| --- | --- | --- |
| 0.2% AMI | 1272 | 782 |
| 0.5% AMI | 2035 | 1682 |
| 1.0% AMI | 2372 | 1890 |
| 0.2% Irganox 1010* | 759 | 24 |
| 0.5% Irganox 1010 | 1325 | 24 |
| 1.0% Irganox 1010 | 1483 | 24 |

*A commercial antioxidant available from Ciba-Geigy Corporation

EXAMPLE 40

SYNTHESIS OF BIS-3-(3,5-DITERTBUTYL-4-HYDROXY-PHENYL)PROPYLMALEATE (BPPM)

To 100 ml of xylene was added 10.0 g of 3-(3,5-di-tert-butyl-4-hydroxyphenyl)propanol, 2.7 g of dimethylmaleate and 10 drops of titanium isopropoxide. The solution was refluxed over a Dean-Stark trap until the theoretical amount of methanol had distilled. The cooled solution was washed with water and evaporated. The oily residue was recrystallized from hexane to give a solid with a melting point of 87°–90° C.

EXAMPLE 41

REACTION OF BPPM WITH POLYPROPYLENE

BPPM was bound to polypropylene in a manner analogous to Example 39. Thus 0.080 g of BPPM, 39.92 g of polypropylene and 0.058 g of Varox DBPH were processed in a torque rheometer to give a mixture containing 65% bound additive by ultraviolet spectroscopic analysis.

EXAMPLE 42

SYNTHESIS OF BIS-(2-ETHYLTHIOETHYL)MALEATE (BETEM)

Ethylhydroxyethylsulfide, 21.2 g, was combined with 14.4 g of dimethylmaleate and 10 drops of titanium isopropoxide in 100 ml of xylene. The solution was refluxed until the theoretical amount of methanol had distilled. The mixture was washed with water, evaporated to dryness and distilled (bp. 150°/0.05 mm) to give a colorless liquid. When BETEM was reacted with polypropylene according to Example 39, it reacted to the extent of 100% as determined by gas chromatography.

What is claimed is:

1. A method for preparing a polymer bound stabilizer which comprises reacting a stabilizer precursor molecule containing a reactive double bond with substituents selected from carboxylic acids, esters, amides and imides on the one and two positions which is not readily homopolymerizable with a preformed polymer selected from polyolefin homopolymers and copolymers, rubber modified polyolefins, polystyrene, rubber modified polystyrene, polyvinylchloride, polyamides, polyesters, and acrylonitrile-butadiene-styrene terpolymers in the presence of a free radical.

2. A method for preparing a polymer bound stabilizer which comprises reacting a stabilizer precursor molecule with a preformed polymer selected from polyolefin homopolymers and copolymers, rubber modified polyolefins, polystyrene, rubber modified polystyrene, polyvinylchloride, polyamides, polyesters, and acrylonitrile-butadiene-styrene terpolymers in the presence of a free radical wherein said stabilizer precursor molecule is represented by the formula:

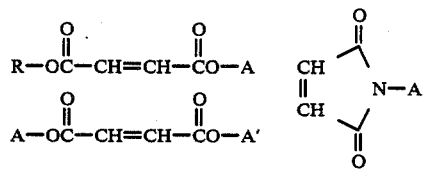
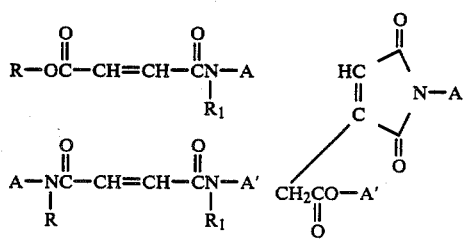

in which
R and $R_1$ are independently selected from hydrogen, or an alkyl group containing from 1 to about 18 carbon atoms, and in which A, and A' are independently selected from

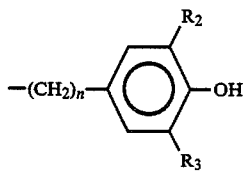

in which n is an integer from 1 to about 6, and $R_2$ and $R_3$ are independently selected from methyl, t-butyl, or phenyl, or

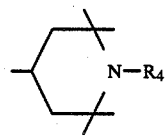

in which $R_4$ is hydrogen, oxygen, or an alkyl or aryl group containing from 1 to about 8 carbon atoms; or

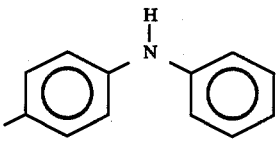

or

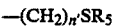

in which n' is an integer from 1 to about 18 and $R_5$ is hydrogen or an alkyl group containing from 1 to about 18 carbon atoms, or

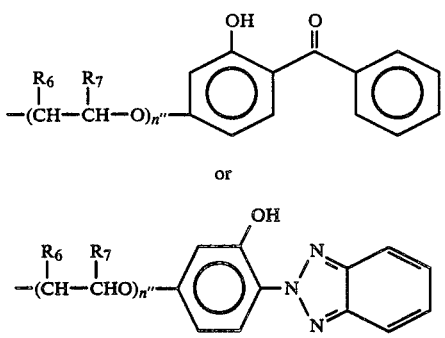

in which $R_6$ and $R_7$ are independently selected from hydrogen, methyl, or ethyl and $n''$ is an integer from 0 to about 10.

3. A method for preparing a polymer bound stabilizer which comprises reacting a stabilizer precursor molecule into a preformed polymer selected from polyolefin homopolymers and copolymers, rubber modified polyolefins, polystyrene, rubber modified polystyrene, polyvinylchloride, polyamides, polyesters, and acrylonitrile-butadiene-styrene terpolymers in the presence of a free radical wherein said stabilizer precursor molecule is selected from

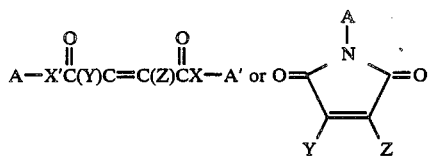

in which:
  X and X' are independently selected from oxygen or nitrogen:
  Y and Z are independently selected from H, $C_1$-$C_{18}$ alkyl groups, or

in which X is defined above, and
  A is selected from chain breaking antioxidants and their precursors, a peroxide decomposer functionality, an ultraviolet light screening functionality, a metal deactivator functionality and a triplet quencher functionality; A' and A independently selected from A, Y or Z.

4. The method according to claim 3 wherein said stabilizer precursor molecules are hindered piperidine stabilizers selected from the group consisting of:

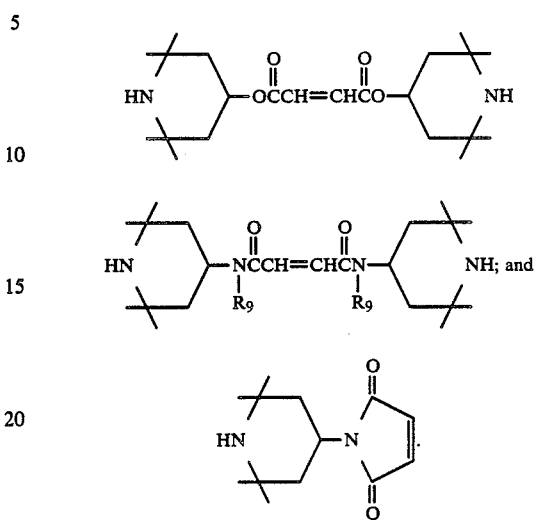

where $R_9$ is selected from hydrogen or a lower alkyl group containing up to 8 carbon atoms.

5. The method according to claim 3 wherein said stabilizer precursor molecules are hindered phenol antioxidants in which A, A' and A'' are independently selected from the group consisting of:

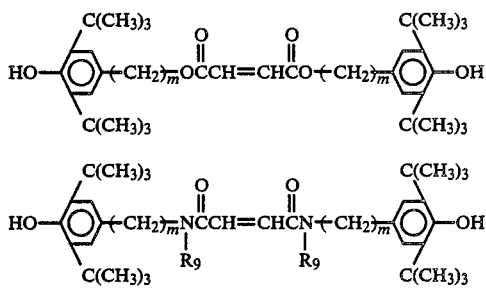

where $m=1$-$6$ and $R_9$ is selected from hydrogen or an alkyl group containing from 1 to about 8 carbon atoms.

6. The method according to claim 3 wherein said stabilizer precursor molecules are arylamine antioxidants selected from the group consisting of:

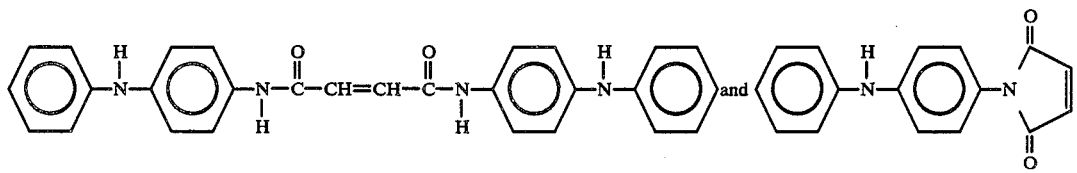

7. The method according to claim 3 wherein said stabilizer precursor molecules are ultraviolet light absorbing stabilizers selected from the group consisting of:

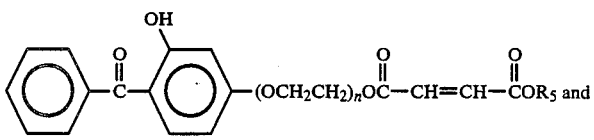

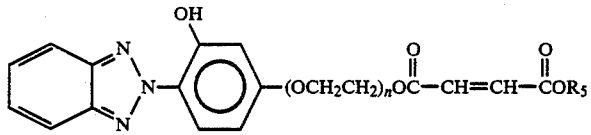

where n=1 to 6 and $R_5$ is selected from hydrogen or an alkyl group containing from 1 to about 18 carbon atoms.

8. The method according to claim 3 wherein said stabilizer precursor molecules are peroxide decomposing antioxidants selected from the group consisting of:

where n' is an integer of from 1 to about 18 and $R_5$ is selected from hydrogen or an alkyl group containing from 1 to about 18 carbon atoms.

9. The method according to claim 3 wherein said stabilizer precursor molecules are metal deactivating stabilizers selected from the group consisting of:

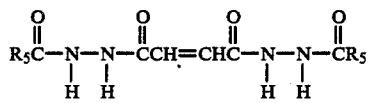

-continued

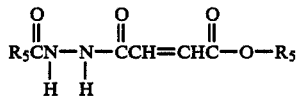

where $R_5$ is selected from hydrogen or an alkyl group containing from 1 to about 18 carbon atoms.

10. The process of claim 1 wherein said polymer is one having less than 15 percent unsaturation and is reacted with said stabilizer precursor molecule to form a masterbatch concentrate of polymer bound stabilizer.

11. The method according to claim 1 wherein said free radical is generated by a mechano-chemical procedure.

12. The method according to claim 1 wherein said free radical is generated by means of actinic radiation.

13. The method according to claim 1 wherein said free radical is generated by means of the addition of a free radical initiator.

14. The method according to claim 1 wherein said free radical is generated by prior oxidation of the polymer.

* * * * *